US011317645B2

(12) United States Patent
Fisher

(10) Patent No.: US 11,317,645 B2
(45) Date of Patent: May 3, 2022

(54) COMPOSITIONS AND METHODS FOR DELAYING AND REDUCING BLOOD ALCOHOL CONCENTRATION

(71) Applicant: Joseph M. Fisher, Redwood City, CA (US)

(72) Inventor: Joseph M. Fisher, Redwood City, CA (US)

( * ) Notice: Subject to any disclaimer, the term of this patent is extended or adjusted under 35 U.S.C. 154(b) by 391 days.

(21) Appl. No.: 16/257,315

(22) Filed: Jan. 25, 2019

(65) Prior Publication Data

US 2019/0230968 A1 Aug. 1, 2019

Related U.S. Application Data

(60) Provisional application No. 62/623,523, filed on Jan. 29, 2018.

(51) Int. Cl.
| *A23L 33/17* | (2016.01) |
| *A23L 33/21* | (2016.01) |
| *A23L 33/115* | (2016.01) |
| *A23L 33/125* | (2016.01) |
| *A23L 33/19* | (2016.01) |
| *A23L 33/185* | (2016.01) |

(52) U.S. Cl.
CPC ............ *A23L 33/17* (2016.08); *A23L 33/115* (2016.08); *A23L 33/125* (2016.08); *A23L 33/185* (2016.08); *A23L 33/19* (2016.08); *A23L 33/21* (2016.08); *A23V 2002/00* (2013.01)

(58) Field of Classification Search
CPC .............................................. A23V 2200/334
See application file for complete search history.

(56) References Cited

U.S. PATENT DOCUMENTS

| 3,954,979 | A | 5/1976 | Bowman |
| 5,133,984 | A | 7/1992 | Murphy et al. |
| 9,168,274 | B1 | 10/2015 | Gropper |
| 9,498,434 | B2 | 11/2016 | Grassi |
| 2013/0017276 | A1* | 1/2013 | Blackman .......... A61K 31/4375 424/717 |
| 2013/0202773 | A1* | 8/2013 | Bufton .................. A23C 19/08 426/631 |
| 2014/0011887 | A1* | 1/2014 | Tang ........................ A61P 1/12 514/665 |
| 2016/0213628 | A1 | 7/2016 | Omidian et al. |

FOREIGN PATENT DOCUMENTS

| CN | 106857824 | * | 7/2017 | ............ A23C 9/13 |
| JP | 2001226277 | * | 8/2001 | ............ A23C 11/10 |
| JP | 2016002000 A | | 1/2016 | |
| WO | WO2006106704 | * | 10/2006 | ............ A23L 1/305 |
| WO | 2006/131932 A1 | | 12/2006 | |
| WO | 2011/051900 A1 | | 5/2011 | |
| WO | 2012/116445 A1 | | 9/2012 | |
| WO | 2012/123748 A1 | | 9/2012 | |
| WO | 2015/035423 A2 | | 3/2015 | |
| WO | 2016/142580 A1 | | 9/2016 | |

OTHER PUBLICATIONS

PCT/US19/15115, International Search Report, dated Mar. 22, 2019.
Fisher, J.M., et al., Effect of a Snack Bar Optimized to Reduce Alcohol Bioavailability: A Randomized Controlled Clinical Trial in Healthy Individuals, J Med Food 23(4):432-439, 2020.

* cited by examiner

*Primary Examiner* — Hasan S Ahmed
(74) *Attorney, Agent, or Firm* — FisherBroyles, LLP; Jill A. Jacobson

(57) ABSTRACT

Compositions and methods are provided for mitigating the effects of alcohol by delaying alcohol absorption and/or reducing blood alcohol concentration, and/or for delaying gastric emptying.

19 Claims, 4 Drawing Sheets

COMPOSITIONS AND METHODS FOR DELAYING AND REDUCING BLOOD ALCOHOL CONCENTRATION

CROSS-REFERENCE TO RELATED APPLICATIONS

This application claims the benefit of U.S. Provisional Application No. 62/623,523, filed on Jan. 29, 2018, which is incorporated herein by reference in its entirety.

FIELD OF THE INVENTION

The invention relates to compositions and methods for delaying or reducing blood alcohol concentration or for delaying gastric emptying in an individual.

BACKGROUND

Ethanol ("alcohol") is a widely-consumed substance that has been in use for thousands of years. Some of the desirable physiological effects of alcoholic beverage consumption include relaxation, release of inhibition, and elevated mood, as well as other general health benefits. However, both acute and chronic overuse of alcohol are sources of significant negative consequences for both the individuals who consume it and society at large. Alcohol is readily absorbed from the gastrointestinal tract after oral consumption and the blood alcohol concentration (BAC) is directly related to the amount of alcohol consumed, the timespan of the consumption, and an individual's ability to eliminate it from their system through metabolic processes.

Mild elevation of the BAC (<0.04%) is associated with the positive effects enumerated above, but higher BACs (>0.08%) are accompanied by negative consequences, including slurred speech, slower reaction times, loss of coordination, mental dysphoria, and overt sickness. High BACs can directly cause death. Alcohol is a regulated substance and in the United States, with sales generally restricted to those aged 21 or older, strict BAC levels (<0.08%) are in force for the legal operation of personal automobiles, and the limit is even lower (<0.04%) for the commercial operation of vehicles.

Currently, common methods for reducing the peak BAC when an individual is drinking alcohol include: (1) limitation on the total amount of alcohol consumed; (2) consuming the alcohol over an extended timeframe so as to cause a more gradual rise of the BAC; and (3) consuming food either before or during the consumption of alcohol.

The current scientific understanding of alcohol absorption in humans is that when taken orally, alcohol is absorbed only slightly in the oral cavity before it makes its way to the stomach. The stomach can then both absorb and metabolize alcohol but at a relatively slow rate; the primary area of alcohol absorption is the proximal portion of the small intestine, where it is rapidly absorbed. Studies have shown that the rate of gastric emptying is highly correlated with the absorption rate of alcohol. It is for this reason that drinking on an empty stomach produces a rapid rise in BAC as the alcohol proceeds very quickly into the intestine in the fasting state. When food is present in the stomach, alcohol is more slowly released into the small intestine with a rate based on a number of variables, including the number of total calories consumed, the proportions of carbohydrate, protein, and fat in the food, the viscosity of the stomach contents, and other physicochemical factors. For this reason, if alcohol is consumed with the presence of food in the stomach, the alcohol is more slowly released into the small intestine, resulting in a more gradual rise of the BAC.

Although all foods eaten before consuming alcohol have some effect on its absorption, there is a need for optimized compositions and methods that will efficiently delay the absorption of alcohol.

BRIEF SUMMARY OF THE INVENTION

In one aspect, edible compositions are provided for delaying and/or reducing an increase in blood alcohol concentration. In some embodiments, the compositions are solid compositions that include: (i) at least about 10% (w/w) protein; and (ii) at least about 0.5% (w/w) hydrocolloid, and/or (iii) at least about 1% (w/w) insoluble fiber. In some embodiments, the solid composition includes about 10% (w/w) to about 50% (w/w) protein. In some embodiments, the solid composition includes about 0.5% (w/w) to about 15% (w/w) hydrocolloid, and/or about 1% (w/w) to about 20% (w/w) insoluble fiber. In some embodiments, the compositions are liquid compositions that include: (i) at least about 5% (w/w) protein; and (ii) at least about 0.25% (w/w) hydrocolloid, and/or (iii) at least about 0.5% (w/w) insoluble fiber.

In some embodiments, the composition includes protein and hydrocolloid. In other embodiments, the composition includes protein and insoluble fiber. In further embodiments, the composition includes protein, hydrocolloid, and insoluble fiber.

In some embodiments, the composition further includes carbohydrate and/or fat.

The edible composition may be formulated as either a solid or liquid. In one embodiment, the composition is formulated as a manufactured food bar. For example, a food bar may include a maximum weight of about 100 g. In another embodiment, the composition is formulated as a liquid, such as a liquid beverage. For example, a liquid composition may include a volume of about 100 ml to about 500 ml.

In some embodiments, the protein component of the edible composition comprises, consists of, or is derived from whey, casein, milk solids, soybean, pea, egg, a legume, a nut, coconut, hemp, an insect, an animal source, a plant source, or a combination thereof. In some embodiments, the composition includes a hydrocolloid that comprises, consists of, or is derived from glucomannan, guar gum, xanthan gum, locust bean gum, pectin, alginate, Carrageenan, Gellan gum, Tara gum, agar gum, Acacia gum, psyllium, carboxymethyl cellulose, or a combination thereof. In some embodiments, the composition includes insoluble fiber that comprises, consists of, or is derived from oat hull, wheat bran, corn bran, citrus, apple, bamboo, soy, hemp, barley or other grains, quinoa, rice, a natural source of cellulose and/or hemicellulose, or a combination thereof.

In another aspect, methods are provided for delaying and/or reducing an increase in blood alcohol concentration. The methods include ingestion of an edible composition as described by an individual, prior to or concurrent with consumption of alcohol, and the increase in blood alcohol concentration due to consumption of the alcohol is delayed and/or reduced in the individual in comparison to the increase in blood alcohol concentration in the absence of ingestion of the edible composition, such as, but not limited to, on an empty stomach. In some embodiments, the edible composition is ingested up to about 10, 20, 30, 60, 90, or 120 minutes prior to alcohol consumption. In other embodiments, the edible composition is ingested concurrently with alcohol consumption. In still other embodiments, the edible composition is ingested about 10, 20, or 30 minutes after alcohol consumption has been completed.

In some embodiments, the alcohol is in the form of one or more alcoholic beverage.

In some embodiments, the total blood alcohol exposure in the individual is reduced, as measured by the area under the curve for 60 or 90 minutes after consumption of alcohol, in comparison with consumption of the alcohol on an empty stomach. For example, the reduction in total blood alcohol exposure may be reduced by at least about 20%, e.g., about 20% to about 60%.

In some embodiments, the peak blood alcohol concentration in the individual is reduced after consumption of alcohol, in comparison with consumption of the alcohol on an empty stomach. For example, the reduction in peak blood alcohol concentration may be reduced by at least about 20%, e.g., about 20% to about 60%.

In some embodiments, gastric emptying is delayed in the individual, resulting in the delay and/or reduction in the increase in blood alcohol concentration. For example, the gastric emptying half time may be increased by at least about 20%, e.g., by about 20% to about 100%.

In another aspect, methods are provided for delaying and/or reducing an increase in blood alcohol concentration. The methods include comprising ingestion of an edible composition as described herein by an individual after consumption of alcohol, e.g., immediately after or within up to about 30 minutes after consumption of alcohol, wherein the increase in blood alcohol concentration due to consumption of the alcohol is delayed and/or reduced in the individual in comparison to the increase in blood alcohol concentration in the absence of ingestion of the edible composition, such as, but not limited to, on an empty stomach. In some embodiments, the alcohol is in the form of one or more alcoholic beverage.

In another aspect, methods are provided for delaying gastric emptying in an individual. The methods include ingestion of an edible composition as described herein by an individual, prior to or concurrent with consumption of a food or a drug substance. Gastric emptying is delayed in the individual in comparison to gastric emptying in the absence of ingestion of the edible composition, such as, but not limited to, on an empty stomach. In some embodiments, the edible composition is ingested up to about 120 minutes prior to consumption of the food or drug substance.

In some embodiments, gastric emptying half time is increased by at least about 20%, e.g., by about 20% to about 100%.

DETAILED DESCRIPTION

Figure 1:
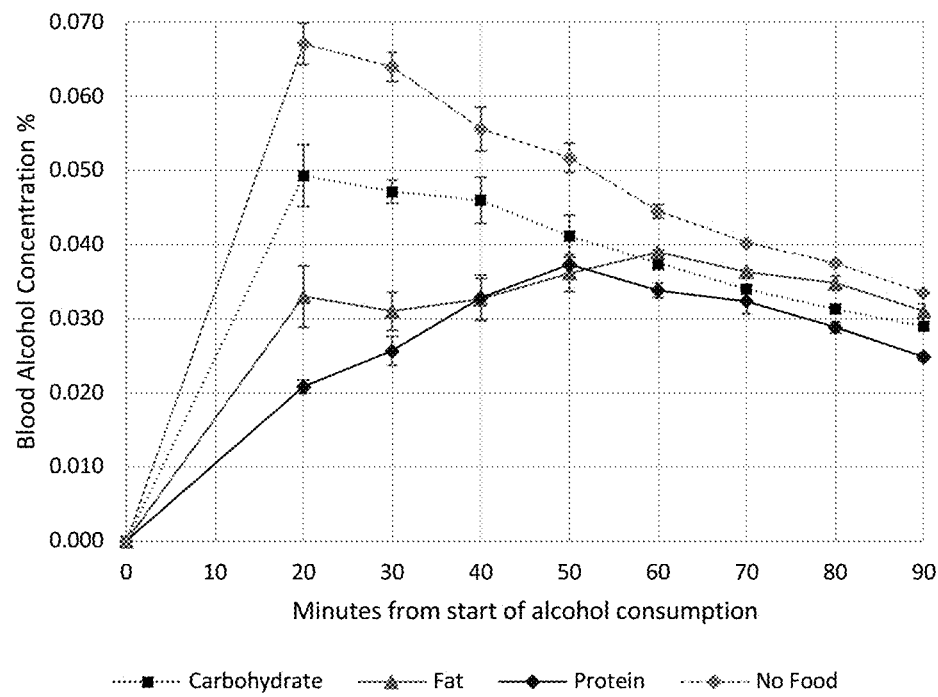
FIG. 1 shows the effects of nutrition bars made with different macronutrient components on blood alcohol concentration (using a 20% alcohol by volume cocktail as the source) in a male test subject, as described in Example 1.

A food composition is disclosed for use in efficiently delaying the absorption of alcohol in an individual. Consumption of the food composition will significantly diminish the peak BAC as compared to the same amount of alcohol consumed, over the same timeframe, in the fasting state or after consuming non-optimized foods of similar mass and/or calorie content. The food composition can be consumed prior to, concurrent with, or after the consumption of alcohol to enable the desired effect of BAC reduction. The food composition may also be consumed in situations in which a decreased rate of gastric emptying is desired.

Unless defined otherwise herein, all technical and scientific terms used herein have the same meaning as commonly understood by one of ordinary skill in the art to which this invention belongs. *The Harper Collins Dictionary of Biology*, Harper Perennial, NY (1991) may provide one of skill with a general dictionary of many of the terms used in this invention. Any methods and materials similar or equivalent to those described herein can be used in the practice or testing of the present invention.

Numeric ranges provided herein are inclusive of the numbers defining the range.

Definitions

"A," "an" and "the" include plural references unless the context clearly dictates otherwise.

"Alcohol" herein refers to ethanol, for example, produced by fermentation of grain or fruit. An "alcoholic beverage" is a liquid beverage that contains ethanol, such as wine, beer, distilled spirits, or a cocktail.

"Blood alcohol concentration" or "BAC" refers to the percentage of ethanol in the blood of an individual, expressed as mass of alcohol per volume of blood. For example, BAC of 0.1 or 0.1% is 0.1 g of alcohol per dL (100 ml) of blood.

"Peak blood alcohol concentration" or "peak BAC" refers to the maximum level of BAC achieved after consumption, or during consumption, of an alcoholic beverage.

"Blood alcohol exposure" refers to the total amount of alcohol in the blood over a defined span of time. It can be expressed as the BAC multiplied by a time unit such as a minute. When plotted on a graph of BAC vs. time, the blood alcohol exposure can be expressed as the area under the curve over a particular time period such as 60 or 90 minutes.

"Edible" refers to a substance that is safe for human consumption.

"Hydrocolloid" refers to a substance that forms a gel in the presence of water. In some embodiments, the substance may also increase the viscosity of the water based solution.

"Insoluble fiber" refers to a water insoluble fibrous substance that is not broken down by human digestive enzymes and absorbed into the bloodstream. Insoluble fiber adds bulk to the waste in the digestive system.

"Gastric emptying" refers to the process of food moving from the stomach to the small intestine through the pyloric sphincter.

"Gastric emptying half time" refers to the time it takes for one half of the stomach's contents, as measured by volume, to enter the small intestine.

"Protein" refers herein to a composition comprised of amino acids and recognized as a protein by those of skill in the art. The term "protein" refers to a polymer of amino acids of any length. The polymer may be linear or branched, it may comprise modified amino acids, and it may be interrupted by non-amino acids. A short polypeptide sequence may be termed a "peptide." "Protein" also refers to protein degradation products including large protein segments, peptides, and amino acids, and/or hydrolyzed protein products.

Edible Compositions

Edible compositions are provided herein, which may be consumed by an individual prior to, concurrently with, or after consumption of alcohol to delay and/or reduce blood alcohol concentration.

The edible compositions herein include one or more protein. Solid compositions may include, for example, at least about 10%, 15%, 20%, 25%, 30%, 35%, 40%, 45%, or 50% (w/w) protein. In some embodiments, solid compositions include about 10% (w/w) to about 50% (w/w), about 10% (w/w) to about 20% (w/w), about 15% (w/w) to about 25% (w/w), about 20% (w/w) to about 30% (w/w), about 25% (w/w) to about 35% (w/w), about 30% (w/w) to about 40% (w/w), about 35% (w/w) to about 45% (w/w), about 40% (w/w) to about 50% (w/w), about 10% (w/w) to about 25% (w/w), or about 20% (w/w) to about 45% (w/w), or about 25% (w/w) to about 50% (w/w) protein. Liquid compositions may include, for example, at least about 5%, 10%, 15%, 20% or 25% (w/w) protein. In some embodiments, liquid compositions include about 5% (w/w) to about 25% (w/w), about 5% (w/w) to about 15% (w/w), about 10% (w/w) to about 20% (w/w), about 15% (w/w) to about 25% (w/w), about 5% (w/w) to about 20% (w/w), or about 10% (w/w) to about 25% (w/w) protein.

The protein may be of any type and in any form that is edible and digestible by an individual. Proteins may be from animal, plant, insect, microorganism, or artificial sources, or a combination thereof. Some exemplary but non-limiting embodiments of protein sources include milk proteins (e.g., whey, casein, milk solids), legumes (e.g., peas, beans (e.g., soybeans)), eggs, coconuts, nuts, nut butters, seeds, or hemp.

The edible compositions herein include one or both of one or more hydrocolloid and one or more insoluble fiber. Solid compositions may include, for example, at least about 0.5%, 1%, 5%, 10%, or 15% (w/w) hydrocolloid and/or at least about 1%, 5%, 10%, 15% or 20% (w/w) insoluble fiber. In some embodiments, solid compositions include about 0.5% (w/w) to about 15% (w/w), about 0.5% (w/w) to about 5% (w/w), about 1% (w/w) to about 10% (w/w), about 1% (w/w) to about 15% (w/w), or about 5% (w/w) to about 15% (w/w) hydrocolloid. In some embodiments, solid compositions include about 1% (w/w) to about 20% (w/w), about 1% (w/w) to about 10% (w/w), about 5% (w/w) to about 15% (w/w), about 5% (w/w) to about 20% (w/w), or about 10% (w/w) to about 20% (w/w) insoluble fiber. Liquid compositions may include, for example at least about 0.25%, 0.5%, 1%, 2.5% 5%, 7.5% or 10% (w/w) hydrocolloid and/or at least about 0.5%, 1%, 2.5%, 5%, 7.5%, or 10% (w/w) insoluble fiber. In some embodiments, liquid compositions include about 0.25% (w/w) to about 10% (w/w), about 0.25% (w/w) to about 1% (w/w), about 5% (w/w) to about 2.5% (w/w), about 1% (w/w) to about 5% (w/w), about 2.5% (w/w) to about 7.5% (w/w), about 5% (w/w) to about 10% (w/w), about 0.5% (w/w) to about 5% (w/w), or about 1% (w/w) to about 10% (w/w), hydrocolloid. In some embodiments, liquid compositions include about 0.5% (w/w) to about 10% (w/w), about 0.5% (w/w) to about 2.5% (w/w), about 1% (w/w) to about 5% (w/w), about 2.5% (w/w) to about 7.5% (w/w), or about 5% (w/w) to about 10% (w/w), about 0.5% (w/w) to about 5% (w/w), or about 1% (w/w) to about 10% (w/w) insoluble fiber.

Some exemplary but non-limiting embodiments of hydrocolloids include glucomannan, a gum (e.g., guar gum, xanthan gum, locust bean gum, Gellan gum, Tara gum, agar gum, Acacia gum), pectin alginate, carrageenan, psyllium, or carboxymethyl cellulose.

Some exemplary but non-limiting embodiments of insoluble fiber include a hull (e.g., oat hull), bran (e.g., wheat bran, corn bran), citrus, apple, bamboo, soy, hemp, a grain (e.g., barley, quinoa, rice), or cellulose and/or hemicellulose derived from a natural source.

In some embodiments, the edible composition may further include carbohydrate and/or fat, which may serve a function such as improving flavor, texture, and/or achieving a target caloric content (e.g., a caloric content of at least about 100 kcal, 200 kcal, or more).

The edible composition may be in any convenient solid or liquid form for consumption by an individual, such as a convenient "snack" size. In one embodiment, the composition is in the form of a manufactured food or nutrition bar, which may be consumed as a snack or meal replacement, for example. The composition may be formed in the shape of a bar, but other shapes are possible and within the scope of the invention, such as cubes, discs, spheres, etc. The composition, e.g., a solid composition such as a food bar, may be about 30, 35, 40, 45, 50, 55, 60, 65, 70, 75, 80, 85, 90, 95, or 100 grams (g) total weight. In some embodiments, the composition may be formed into smaller "bite sized" portions, such as about 10 g to about 30 g per piece. If a liquid composition, the total weight may range from about 30 g to about 500 g, e.g., about 30, 40, 50, 60, 70, 80, 90, 100, 125, 150, 175, 200, 225, 250, 275, 300, 325, 350, 375, 400, 425, 450, 475, or 500 g total weight. In some embodiments, the liquid composition is about 100 ml to about 500 ml in volume.

A solid edible composition may be in the form of a cooked or baked item such as a pastry (e.g., brownie, cookie), cracker, biscuit, bread, granola, cereal or other ready to eat format. The composition may be of the form where each serving is individually shaped or as part of a larger item that must be divided into portions before consumption.

Methods for Delaying and/or Reducing Blood Alcohol Concentration

Methods are provided for reducing and/or delaying an increase in blood alcohol concentration. The methods may be used to mitigate the effects of alcohol, such as prevention of a rapid rise in blood alcohol concentration when consuming alcohol.

In some embodiments, methods are provided in which an edible composition as described herein is ingested by an individual prior to or concurrently with consumption of alcohol, resulting in delay and/or reduction of blood alcohol concentration that would otherwise occur in the individual without ingestion of the edible composition, for example, when consuming the alcohol on an empty stomach or after consuming non-optimized foods of similar mass and/or calorie content. For example, the edible composition may be ingested up to about 10, 20, 30, 60, 90, or 120 minutes prior to alcohol consumption, or concurrently with alcohol consumption.

In some embodiments, methods are provided in which an edible composition as described herein is ingested by an individual after consumption of alcohol, resulting in delay and/or reduction of blood alcohol concentration that would otherwise occur in the individual without ingestion of the edible composition, for example, on an empty stomach prior to alcohol consumption or after consuming non-optimized foods of similar mass and/or calorie content. For example, the edible composition may be ingested up to about 30 minutes after alcohol consumption.

The alcohol consumed by the individual may be in the form of one or more alcoholic beverage, for example, beer, wine, fermented spirits, or a mixed drink cocktail, or in any other alcohol-containing composition, such as in a solid or semi-solid form.

In some embodiments, total blood alcohol exposure is reduced in the individual, for example, as measured by the area under the curve (AUC), e.g., AUC for 90 minutes after alcohol consumption. For example, blood alcohol exposure may be reduced by at least about 20%, 30%, 40%, 50%, or 60%. In some embodiments, the blood alcohol exposure is reduced by about 20% to about 60%, about 20% to about 40%, about 30% to about 50%, about 40% to about 60%, about 20% to about 30%, about 30% to about 40%, about 40% to about 50%, or about 50% to about 60%.

In some embodiments, the peak blood alcohol concentration is reduced in the individual. For example, peak blood alcohol concentration may be reduced by at least about 20%, 30%, 40%, 50%, or 60%. In some embodiments, the peak blood alcohol concentration is reduced by about 20% to about 60%, about 20% to about 40%, about 30% to about 50%, about 40% to about 60%, about 20% to about 30%, about 30% to about 40%, about 40% to about 50%, or about 50% to about 60%. If larger amounts of the edible composition are consumed, such as greater than 1.5 g per kg of bodyweight, peak blood alcohol concentration may be reduced by >60%.

In some embodiments, gastric emptying is delayed in the individual, contributing to the delay and/or reduction in blood alcohol concentration. For example, gastric emptying half time may be increased by at least about 20%, 30%, 40%, 50%, 60%, 70%, 80%, 90%, or 100%. In some embodiments, gastric emptying half time is increased by about 20% to about 100%, about 20% to about 40%, about 50%, to about 70%, about 60% to about 80%, about 70% to about 90%, about 80% to about 100%, about 20% to about 60%, about 60% to about 100%, about 20% to about 30%, about 30% to about 40%, about 40% to about 50%, about 50% to about 60%, about 60% to about 70%, about 70% to about 80%, about 80% to about 90%, or about 90% to about 100%.

In some embodiments, the amount of a solid edible composition that is ingested by the individual is any of about 30 g, 35 g, 40 g, 45 g, 50 g, 55 g, 60 g, 65 g, 70 g, 75 g, 80 g, 85 g, 90 g, 95 g, or 100 g, or any of about 30 g to about 50 g, about 40 g to about 60 g, about 50 g to about 70 g, about 60 g to about 80 g, about 70 g to about 90 g, or about 80 g to about 100 g. In other embodiments, the amount of a liquid composition that is ingested by the individual is any of about 30 g, 40 g, 50 g, 60 g, 70 g, 80 g, 90 g, 100 g, 125 g, 150 g, 175 g, 200 g, 225 g, 250 g, 275 g, 300 g, 325 g, 350 g, 375 g, 400 g, 425 g, 450 g, 475 g, or 500 g, or any of about 30 g to about 100 g, about 50 g to about 150 g, about 100 g to about 200 g, about 150 g to about 250 g, about 200 g to about 300 g, about 250 g to about 350 g, about 300 g to about 400 g, about 350 g to about 450 g, or about 400 g to about 500 g. In some embodiments, the liquid composition is in a volume of about 100 ml to about 500 ml.

In some embodiments, a solid composition is administered at about 0.5 g to about 2 g per kg of body weight of the individual. In other embodiments, a liquid composition is administered at about 1 g to about 5 g per kg of body weight of the individual.

Methods for Delaying Gastric Emptying

Methods are provided for delaying gastric emptying. The methods may be used to delay transit of a food or drug substance from the stomach, for example, to slow the absorption of a drug substance or to retard food digestion. In certain embodiments, the method may be used to slow the absorption of caffeine or to slow the breakdown of carbohydrate into simpler sugars.

In some embodiments, methods are provided for delaying gastric emptying (e.g., increasing gastric emptying half time) in an individual, prior to or concurrent with consumption of a food or drug substance, resulting in delay of gastric emptying in comparison to the rate of gastric emptying that would otherwise occur in the individual without ingestion of the edible composition, for example, when consuming the food or drug substance on an empty stomach or after consuming non-optimized foods of similar mass and/or calorie content. For example, the edible composition may be ingested up to about 10, 20, 30, 60, 90, or 120 minutes prior to consumption of the food or drug substance.

For example, gastric emptying half time may be increased by at least about 20%, 30%, 40%, 50%, 60%, 70%, 80%, 90%, or 100%. In some embodiments, gastric emptying half time is increased by about 20% to about 100%, about 20% to about 40%, about 50%, to about 70%, about 60% to about 80%, about 70% to about 90%, about 80% to about 100%, about 20% to about 60%, about 60% to about 100%, about 20% to about 30%, about 30% to about 40%, about 40% to about 50%, about 50% to about 60%, about 60% to about 70%, about 70% to about 80%, about 80% to about 90%, or about 90% to about 100%.

In some embodiments, the amount of a solid edible composition that is ingested by the individual is any of about 30 g, 35 g, 40 g, 45 g, 50 g, 55 g, 60 g, 65 g, 70 g, 75 g, 80 g, 85 g, 90 g, 95 g, or 100 g, or any of about 30 g to about 50 g, about 40 g to about 60 g, about 50 g to about 70 g, about 60 g to about 80 g, about 70 g to about 90 g, or about 80 g to about 100 g. In other embodiments, the amount of a liquid composition that is ingested by the individual is any of about 30 g, 40 g, 50 g, 60 g, 70 g, 80 g, 90 g, 100 g, 125 g, 150 g, 175 g, 200 g, 225 g, 250 g, 275 g, 300 g, 325 g, 350 g, 375 g, 400 g, 425 g, 450 g, 475 g, or 500 g, or any of about 30 g to about 100 g, about 50 g to about 150 g, about 100 g to about 200 g, about 150 g to about 250 g, about 200 g to about 300 g, about 250 g to about 350 g, about 300 g to about 400 g, about 350 g to about 450 g, or about 400 g to about 500 g. In some embodiments, the liquid composition is in a volume of about 100 ml to about 500 ml.

In some embodiments, a solid composition is administered at about 0.5 g to about 2 g per kg of body weight of the individual. In other embodiments, a liquid composition is administered at about 1 g to about 5 g per kg of body weight of the individual.

The following examples are intended to illustrate, but not limit, the invention.

EXAMPLES

Example 1

Experiments were performed with various food compositions in the form of nutrition bars of different masses and macronutrient content in comparison to a condition during which no food was consumed.

On the day of testing, the test subject, a 75 kg male with a body mass index of 24.5, had a consistent diet and exercise routine, in order to minimize experimental variation.

Experimental protocol:
1) Breakfast: 1 cup black coffee, 40 g bran flakes (Trader Joe's), 10 g raisins, 130 g almond milk. Between breakfast and lunch, the test subject exercised for 30 minute (min)-1 hour (hr).
2) Lunch: 20 g pecans, one mozzarella cheese stick, one frozen lasagna entrée (Annie's Homegrown), 8 oz of water.
3) Fast: After lunch, only water or non-caloric clear liquids were consumed for 6 hr.
4) Food composition: After the fast, the test subject consumed 8 oz of water ("no food" condition), or 8 oz water plus the food composition. The water and food composition were consumed over the course of 10 min.
5) Alcohol: 5 min after completely consuming the water (plus or minus a food composition), an alcoholic beverage was consumed over a 10 min timeframe. The drink consisted of 76 g Vodka (40% alcohol by volume) and 76 g tonic water, with one large spherical ice cube. The final beverage composition was 20% alcohol and was dosed such that the subject received approximately 0.4 g alcohol per kg of body weight.
6) BAC measurement: After the alcoholic beverage was consumed, at 10 min, the test subject's mouth was rinsed with water twice. BAC was measured every 10 min, starting with 20 min after initiation of alcoholic beverage consumption, using a calibrated breathalyzer (BACTRACK S80). Readings were obtained until 90 min after the start of alcoholic beverage consumption. The peak BAC and area under the curve (AUC) were determined over the course of the 90 min. test period.

The nutrition bars included the macronutrient compositions shown in Table 1.

TABLE 1

Composition of test nutrition bars

| Test Bar | Carbohydrate(g) | Protein(g) | Fat(g) | Kcal | Oat Fiber (g) (IF) | Glucomannan(g) (SF) |
|---|---|---|---|---|---|---|
| Carbohydrate | 44.1 | 4.6 | 6.5 | 240 | 0 | 0 |
| Protein | 36.8 | 20 | 5 | 245 | 0 | 0 |
| Prot + IF | 37.6 | 19.8 | 5 | 226 | 5 | 0 |
| Prot + SF | 37 | 19.9 | 5 | 233 | 0 | 3 |
| Fat | 30 | 2.8 | 14.4 | 248 | 0 | 0 |
| Fat + IF | 30 | 2.8 | 14.4 | 229 | 5 | 0 |
| Fat + SF | 30 | 2.8 | 14.4 | 237 | 0 | 3 |

The ingredients that were used to create the nutrition bars included: almond butter, almonds, honey, corn fiber syrup, rice flour, whey protein isolate, cocoa butter, vegetable glycerin, sunflower lecithin, plum puree, granola (Udi's Au Naturel), purified insoluble oat fiber (Canadian Harvest), purified soluble fiber (glucomannan, TIC gums).

FIG. 1 shows the results with three different nutrition bars versus the condition where no food was consumed. Unless otherwise specified, for this and all following Figures and Examples, each experimental condition was repeated a total of 3 times each, on separate days, and each data point plotted is the average of the 3 trials with the error bars indicating plus or minus the standard error of the mean. The exception to this was the "No Food" condition which was repeated a total of 4 times, 2 trials of 60 minute duration and 2 trials of 90 minute duration. "No Food" refers to the condition of only consuming water after the fast period prior to consuming alcohol.

The three bars for which results are shown in FIG. 1 included a bar with high carbohydrate content (with low protein and fat) ("Carbohydrate"), a bar with high protein content (with low fat and lower carbohydrate) ("Protein"), and a bar with high fat content (with low protein and lowered carbohydrate content) ("Fat"), as described in Table 1; all bars had similar total calories. The graph demonstrates a clear distinction between the effect of consuming a high carbohydrate bar versus either the high protein or fat bars. In terms of peak BAC, the carbohydrate bar (0.049%) was significantly higher than either the high fat (0.039%) or the high protein (0.037%) bar and peaked much earlier (20 minutes versus 50 or 60 minutes after drinking commenced). Furthermore, in terms of total alcohol absorption, as measured by the area under the curve, in comparison with the no food control, the high protein bar inhibited alcohol absorption the most over 90 minutes (41.9% reduction) versus the high carbohydrate (19.3% reduction) and the high fat bar (31.9% reduction). For the purposes of optimizing the effect of diminishing alcohol absorption, the high fat and high protein bars were used as starting points for further experiments.

Figure 2:
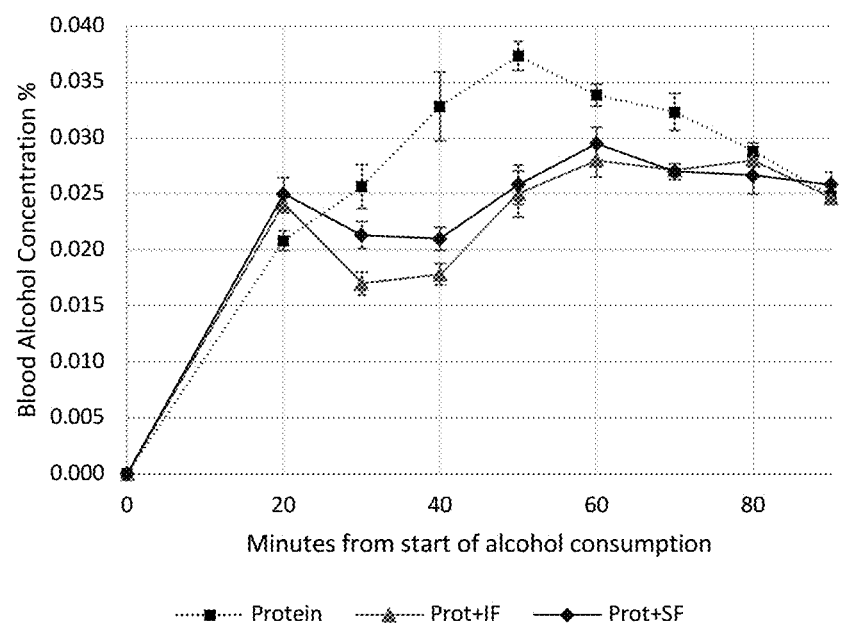
FIG. 2 shows the effects of nutrition bars containing high protein, high protein plus insoluble fiber, and high protein plus soluble fiber, on blood alcohol concentration, as described in Example 2.

FIG. 2 illustrates the effects of adding either insoluble fiber (Prot+IF) or soluble viscosity inducing fiber (Prot+SF) to the "Protein" bar used for the data depicted in FIG. 1. In these bars, the equivalent amount of rice flour was removed from the "Protein" bar recipe of Table 1 and replaced with either type of fiber, thus lowering the total caloric content of the bars. Either the addition of insoluble fiber (5 g of oat hull fiber, Canadian Harvest) or soluble fiber (3 g Ticagel Glucomannan, TIC Gums) provided the bar with added potency and both reduced the peak BAC as well as total alcohol absorption. Compared to the Protein bar without additional fiber, peak BACs were reduced by 25% and 21% for the IF and SF bars, respectively. Similarly, the amount of total alcohol absorbed over the 90 minute experiment, as measured by the AUC90 min, was reduced by 18.3% and 14% for the IF and SF bars, respectively.

Figure 3:
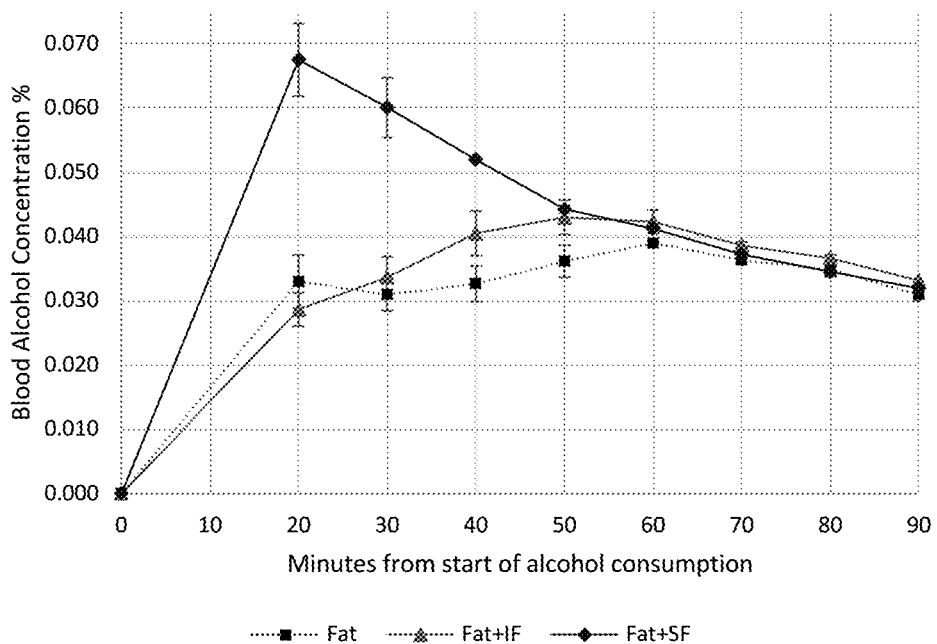
FIG. 3 shows the effects of nutrition bars containing high fat, high fat plus insoluble fiber, and high fat plus soluble fiber, on blood alcohol concentration, as described in Example 2.

FIG. 3 demonstrates that the effects observed for both IF and SF in combination with protein do not translate over to their combination with fat. The components of the high "Fat" bar of Table 1 were modified whereby an equivalent amount of rice flour was replaced with either IF or SF, as done with the protein bars that were used for the data depicted in FIG. 2. In this case, the addition of IF increases the peak BAC (up 10.3%) and SF does so even more dramatically (up 73.1%) as compared to the "Fat" bar. Similarly, total alcohol absorption was also increased by the addition of the fibers (AUC90 up 7.1% for IF and 40.6% for SF). Due to the apparent failure of the Fat+SF bar to reduce alcohol absorption and peak BAC, that experiment was only conducted 2 times as compared to 3 each for the Fat+IF and Fat bars. FIGS. 1-3 suggest that the most potent formulations for both reducing the peak BAC and total alcohol absorption include either high protein content or even more so high protein content in conjunction with either insoluble or soluble/viscosity inducing fiber.

Example 2

The experiments with the nutrition bars from Example 1 demonstrated that the combination of protein and either insoluble or soluble/viscosity inducing fibers can significantly affect alcohol absorption and in vivo alcohol kinetics in humans. Based on this finding, an example bar ("Test") was created and compared to other foods that were not optimized for these properties, including a 3-course meal used as a positive control.

The following foods were tested, using the methodology described in Example 1. "Full Meal" refers to consuming a meal consisting of 70 g romaine lettuce, 100 g tomatoes, 1 Tablespoon of red wine/olive oil dressing (Trader Joe's), 1 slice of white bread (Trader Joe's), and 1 frozen entrée (Farfalle with 4 cheeses and spinach, Trader Joe's). "PrBar" refers to consuming a high protein nutrition bar (Quest Nutrition, cookies and cream flavor). "MZL" refers to consuming mozzarella sticks (Organic Valley). "Test" refers to a food composition, a 72 g nutrition bar, optimized to slow alcohol absorption, containing a total of 5 g (6.94%) of oat hull fiber and 0.2 g (0.28%) of Glucomannan. The ingredients of the "Test" bar included the following: Almond butter, honey, IMO corn syrup (Vitafiber brand), Milk and Whey protein concentrate (Arla brand), Whey protein crisps (Grande brand), insoluble oat fiber (Canadian Harvest brand), prune puree, glycerine, coconut, sunflower lecithin, vanilla extract sea salt, Glucomannan (TIC Gums), and natural flavoring.

The nutritional information of the food compositions is summarized in Table 2 below.

TABLE 2

Nutritional information for the food compositions in Example 2

| Food | Mass (g) | Kcal | Protein (g) | Fat (g) | Carbohydrate(g) |
|---|---|---|---|---|---|
| No Food | 0 | 0 | 0 | 0 | 0 |
| Full Meal | 532 | 559 | 19.7 | 21.6 | 73.5 |
| PrBar | 60 | 200 | 21 | 8 | 21 |
| MZL | 70 | 200 | 17.5 | 15 | 0 |
| Test | 72 | 280 | 18 | 14 | 31 |

Figure 4:
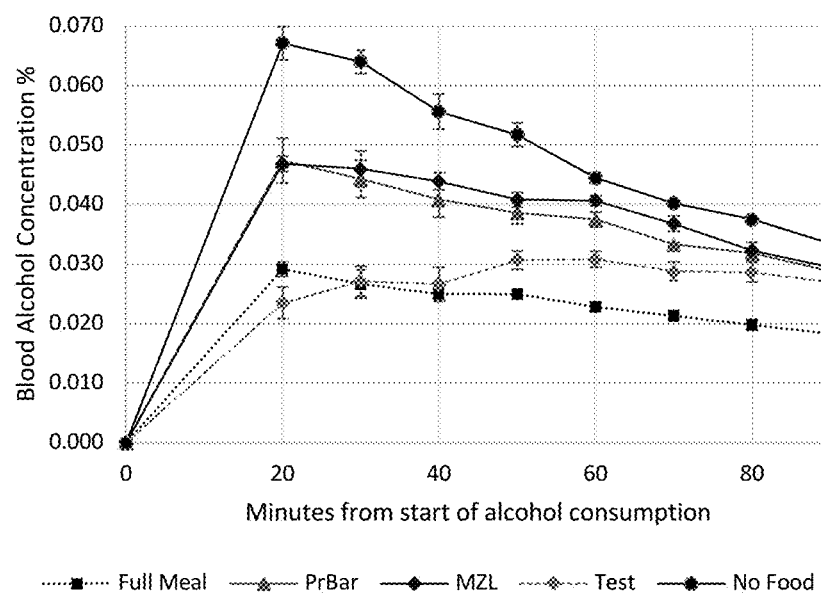
FIG. 4 shows the effects of various food compositions on blood alcohol concentration, as described in Example 3.

The results are shown in FIG. 4. The peak BAC, % peak BAC reduction compared to "No Food", area under the curve for 60 and 90 minutes, and % AUC 60/90 reductions compared to "no food" are summarized in Table 3 below.

TABLE 3

The effect of various food compositions on blood alcohol concentration

| Food | pBAC | pBAC % | AUC60 | AUC90 | AUC60% | AUC90% | TTP |
|---|---|---|---|---|---|---|---|
| No Food | 0.067 | 0 | 2.946 | 4.038 | 0 | 0 | 20 |
| Full Meal | 0.029 | 56.8% | 1.318 | 1.936 | 55.3% | 52.0% | 20 |
| PrBar | 0.047 | 30.0% | 2.137 | 3.12 | 27.5% | 22.7% | 20 |
| MZL | 0.047 | 30.0% | 2.21 | 3.26 | 25.0% | 19.3% | 20 |
| Test | 0.031 | 53.8% | 1.352 | 2.216 | 54.1% | 45.1% | 60 |

Food definitions are described in Example 2, all measurements are relative to the start of drinking alcohol.
pBAC: peak BAC obtained over 90 minutes.
pBAC %: % reduction of the pBAC as compared to the "No Food" condition.
AUC60: The area under the curve for the first 60 minutes.
AUC90: The area under the curve for all 90 minutes.
AUC60%: The % reduction of the AUC60 as compared to the "No Food" condition.
AUC90%: The % reduction of the AUC90 as compared to the "No Food" condition.
TTP: The time in minutes from the start of drinking to attaining the pBAC.

FIG. 4 and Table 3 illustrate the effects of the various tested food compositions had on the absorption and elimination of alcohol in a human test subject. Based on the relatively small standard errors of the measurements, the results appear to be highly reproducible under the experimental conditions.

In the "No Food" condition, the peak of 0.067% BAC was achieved quickly, at 20 minutes, suggesting fast transit of the majority of the alcohol to the small intestine, where it was rapidly absorbed.

The positive control condition, represented by the "Full Meal", demonstrated the most robust inhibition of the rise of the BAC with a peak of only 0.029%, a 56.8% reduction as compared to the "No Food" condition. The total blood exposure to alcohol, as measured by the AUC60 and AUC90, was significantly reduced by 55.3% and 52.0%, respectively, suggesting enhanced first pass metabolism of the alcohol, which is consistent with published studies of the effects of meals on gastric emptying time, resulting in an increased elimination rate.

The other food compositions, "PrBar", "MZL", and "Test", all demonstrated some intermediate effects on the BAC in between that of "No Food" and "Full Meal". The "Test" composition, which included protein content comparable to the other foods and additionally included oat hull fiber and Glucomannan, had an effect much closer to the "Full Meal" than to either "PrBar" or "MZL".

In the "Test" case, the peak BAC was only 0.031%, which was only slightly higher and not statistically different than the "Full Meal" (0.029%), and pBAC was reached significantly later than all other food compositions (60 vs. 20 min). This slow absorption and release of the alcohol after consumption of "Test" is suggestive of a unique mechanism of action which differentiates it from the other food compositions tested

Example 3

The "Test" food composition described in Example 2 (containing 6.94% oat fiber and 0.28% Glucomannan) was evaluated in a dose dependent fashion, using the experimental protocol outlined in Example 1. The doses selected were 36 g (½ bar), 72 g (full bar), and 108 g (1½ bars) which was a range of approximately 0.5 to 1.5 g of food composition per kg body weight of the test subject. The data for this study, along with the 0 g (No Food) comparison done previously (Example 2), are plotted in FIG. 5 and summarized in Table 4. For each condition the experiment was repeated 3 times, each time on a separate day.

Figure 5:
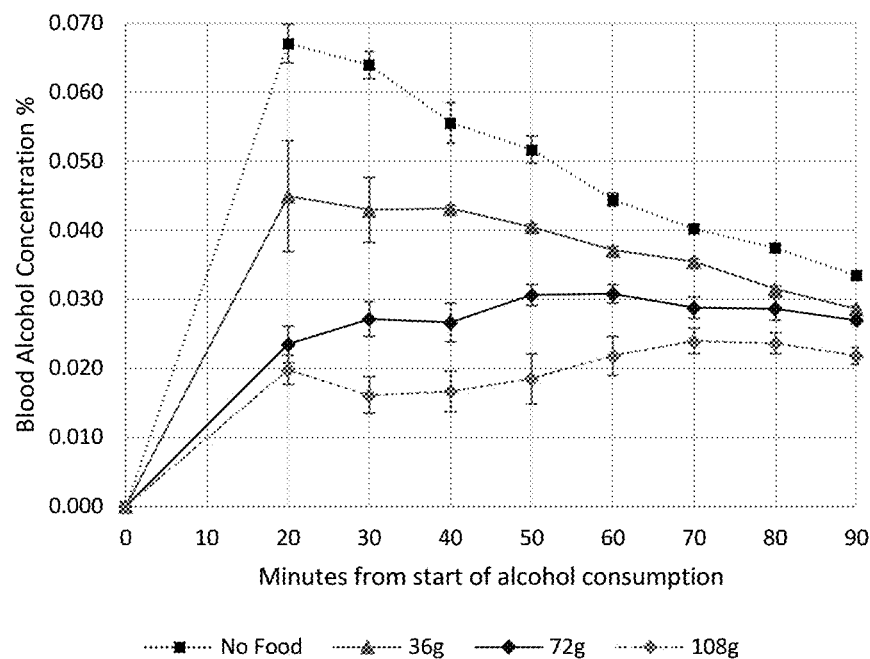
FIG. 5 shows the dose dependent effects of a nutrition bar containing high protein plus insoluble fiber on blood alcohol concentration, as described in Example 3.

FIG. 5 shows the time course of the blood alcohol concentration for each dose of the Test bar; each point represents the mean of 3 measurements with the error bars indicating the mean plus or minus the standard error of the mean. A dose dependent effect on the BAC was observed, with the 36 g composition having the smallest effect and the 108 g the largest. This effect is consistent for peak BAC, the area under the curves, and the time to reach the peak BAC. Table 4 below summarizes and details the results from the dose response experiment.

TABLE 4

Summary data for the dose response of Test food composition

| Condition | pBAC | pBAC % | AUC60 | AUC90 | AUC60% | AUC90% | TTP |
|---|---|---|---|---|---|---|---|
| 0 g (No Food) | 0.067 | 0 | 2.946 | 4.038 | 0 | 0 | 20 |
| 36 g | 0.045 | 33.0% | 2.13 | 3.13 | 27.7% | 22.5% | 20 |
| 72 g | 0.031 | 53.8% | 1.352 | 2.216 | 54.1% | 45.1% | 60 |
| 108 g | 0.024 | 64.2% | 0.92 | 1.62 | 68.8% | 59.9% | 70 |
| Full Meal | 0.029 | 56.8% | 1.318 | 1.936 | 55.3% | 52.0% | 20 |

Notes:
Food defirftions and compositions are described in Example 2 all measurements are relative to the start of drinking alcohol.
pBAC: peak BAC obtained over 90 minutes.
pBAC %: % reduction of the pBAC as compared to the "No Food" condition.
AUC60: The area under the curve for the first 60 minutes. AUC90: The area under the curve for all 90 minutes.
AUC60%: The % reduction of the AUC60 as compared to the "No Food" condition.
AUC90%: The % reduction of the AUC90 as compared to the "No Food" condition.
TTP: The time in minutes from the start of drinking to attaining the pBAC.
The "Full Meal" data, derived from a separate set of experiments, is included here to facilitate comparison.

Of note, the 108 g dose of the Test composition had a lower peak BAC than the "Full Meal" (0.024% vs 0.029%), and also exhibited considerably lower AUC 60 and 90 values in comparison to the "No Food" condition, at 68.8% and 59.9%, respectively. The time to reach the peak BAC, as indicated by the arrows in FIG. 5, showed a dose dependent progression toward longer times, as the 108 g dose peaked at 70 minutes, with the 80 minute timepoint nearly identical to the 70 minute value. The Test food composition's ability to delay the peak BAC is distinct from the other food compositions tested in Example 2, as well as other meals under similar experimental conditions as reported in the scientific literature. These results further suggest that the Test composition described here has a distinct mechanism of action on the human gut which gives rise to the unique time course of the BAC.

Example 4

To test whether the additive effects of protein and insoluble fiber on alcohol absorption exhibit a similar effect with liquid compositions, two liquid compositions were prepared. The compositions were tested using the standard protocol as described in Example 1; however, in this case no additional water was consumed.

Figure 6:
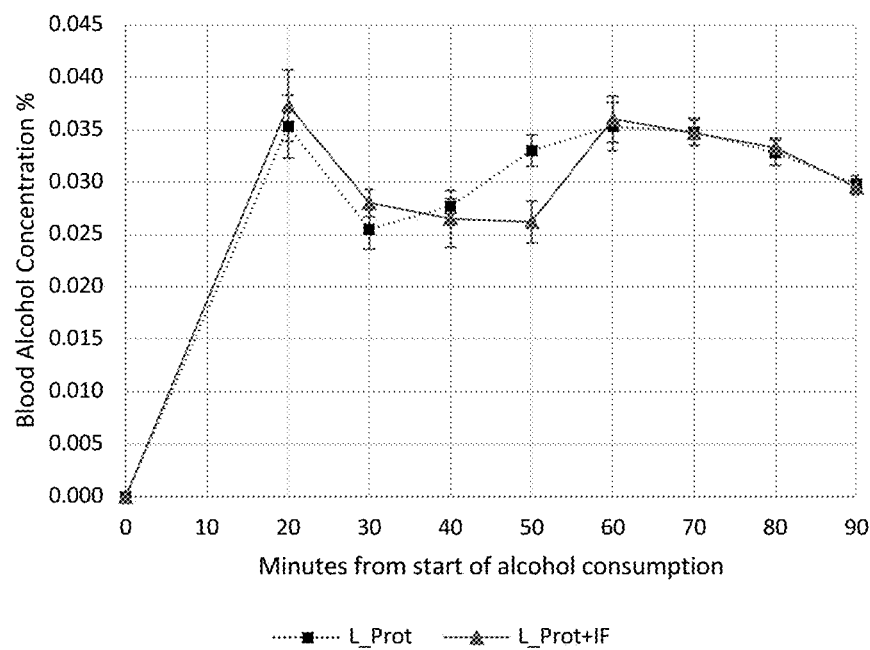
FIG. 6 shows the effects of liquid compositions on blood alcohol concentration, as described in Example 4.

The first composition, "L_Prot" included 8 oz. of skim milk (Fairlife brand), with an additional 8.14 g of purified whey protein isolate (Isopure, Nature's Best brand). The second composition, "L_Prot+IF," was identical to "L_Prot" but also included 5 g of purified insoluble fiber in the form of oat hull fiber (Canadian Harvest Brand). Each composition contained a total of 20 grams of protein, 6 grams of sugar, 0 grams of fat, and 110 total calories. The liquid compositions were consumed 5 minutes prior to the consumption of alcohol, with all other conditions the same as described in Example 1. The results are shown in FIG. 6.

Both liquid compositions exhibited significant inhibition of alcohol absorption as compared to the No Food condition (FIGS. 1, 4, and 5) and were consistent with the results obtained from the high protein solid compositions of Examples 1-3. The addition of insoluble fiber (Prot+IF) did not add to the effect shown by the liquid L_Prot composition in a statistically significant manner. The peak BAC for L_Prot+IF was 0.0373%, and the AUC90 was 2.554. For the L_Prot composition, peak BAC was 0.0353% and AUC90 was 2.570. The time course of the BAC profiles were very similar, the only significant difference being at the 50 minute time point where the L_Prot composition had a higher BAC level than L_Prot+IF. In comparison to the solid compositions described above, both high protein liquid compositions were potent at reducing alcohol absorption, and more so than the solids on a calorie for calorie comparison.

Example 5

A set of experiments was designed to test how effective the invention composition was using red wine as the source of alcohol instead of the 20% by volume cocktail described in Example 1. The experimental protocol and measurements were identical to those in Example 1 with the following modifications. Instead of consuming the food before the alcohol, it was eaten during the first five minutes of consuming the alcohol, both eating and drinking together over this time period. The remainder of the wine was consumed over the following 15 minutes such that the alcoholic drink was finished 20 minutes from its start. There was no additional water consumed along with the food and the source of alcohol consisted of 10 oz of red wine with 13% alcohol by volume. The length of time for the experiments was extended to 120 minutes from the 90 minute timespan of Example 1.

The following foods were tested in the experiments. "Test" refers to a protein and insoluble fiber nutrition bar composition as described supra, which consisted of the following ingredients: Almond butter, honey, IMO corn syrup (Vitafiber brand), Milk and Whey protein concentrate (Arla brand), Whey protein crisps (Grande brand), insoluble oat fiber (Canadian Harvest brand), prune puree, glycerine, coconut, sunflower lecithin, vanilla extract sea salt, water, and natural flavoring. "CHMX" refers to a common and commercially available snack mix (Chex Mix, General Mills, Inc., Minneapolis, Minn.). "EBAR" refers to a nutrition/snack bar commercially purchased (chocolate cherry bar, Element Bars Inc., Chicago, Ill.). The foods were close to isocaloric with each other in order to evaluate their effect on alcohol absorption per calorie. The nutritional information for the food compositions tested is summarized in Table 5.

TABLE 5

Nutritional information for the food compositions in Example 5

| Food | Mass (g) | Kcal | Protein (g) | Fat (g) | Carbohydrate(g) |
|---|---|---|---|---|---|
| No Food | 0 | 0 | 0 | 0 | 0 |
| Test | 70 | 250 | 20 | 11 | 29 |
| CHMX | 60 | 255 | 5 | 6 | 45 |
| EBAR | 60 | 251 | 6.2 | 10.1 | 36 |

Figure 7:
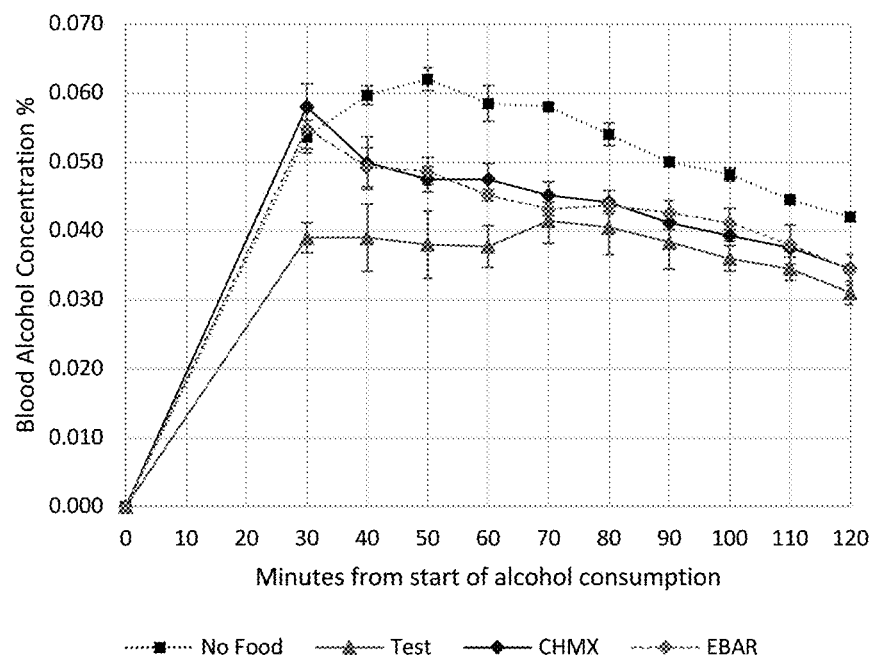
FIG. 7 shows the effects of solid compositions on blood alcohol concentration (using 13% alcohol by volume wine as the source) as described in Example 5.

The experimental results are shown in FIG. 7 and Table 6. The peak BAC, % peak BAC reduction compared to "No Food", area under the curve for 60 and 120 minutes, the % AUC 60/120 reductions compared to "No Food", and the amount of time it took to reach the peak BAC for all trials are summarized below. Each measure is the average from three separate experiments.

TABLE 6

The effect of various food compositions on blood alcohol concentration

| Food | pBAC | pBAC % | AUC60 | AUC120 | AUC60% | AUC120% | TTP |
|---|---|---|---|---|---|---|---|
| No Food | 0.062 | 0 | 2.583 | 5.632 | 0 | 0 | 50 |
| Test | 0.041 | 33.2% | 1.739 | 3.990 | 32.7% | 29.2% | 70 |
| CHMX | 0.058 | 6.5% | 2.371 | 4.854 | 8.2% | 13.8% | 30 |
| EBAR | 0.055 | 11.6% | 2.301 | 4.786 | 10.9% | 15% | 30 |

All measurements are relative to the start of drinking alcohol (time = 0)
pBAC: peak BAC obtained over 120 minutes.
pBAC %: % reduction of the pBAC as compared to the "No Food" condition.
AUC60: The area under the curve for the first 60 minutes.
AUC120: The area under the curve for all 120 minutes.
AUC60%: The % reduction of the AUC60 as compared to the "No Food" condition.
AUC120%: The % reduction of the AUC120 as compared to the "No Food" condition.
TTP: The time in minutes from the start of drinking to attaining the pBAC.

The "No Food" condition resulted in a more prolonged absorptive phase (TTP=50) than seen in experiments using the more concentrated cocktail (FIGS. 1, 3, 4, and 5) where the TTP was 20 minutes; this was expected based on both the extended drinking time (20 minutes in the experiments) and other published reports. The pBAC was significantly reduced by the "Test" food (33.2%) compared to the "No Food" control as well as compared to the other isocaloric foods which showed more modest reductions ("CHMX" 6.5% and "EBAR" 11.6%). Furthermore, the pBAC reductions for the various foods were paralleled by similarly sized reductions of both the AUC60 and the AUC120. Over the course of the experiment, the "Test" food reduced the total blood alcohol exposure (as measured by the AUC120) almost twice as much as the other two foods (29.2% vs 13.8% and 15%). Lastly and consistent with the previous Examples, the "Test" food delayed the pBAC compared to all other conditions with a TTP of 70 minutes. The overall effect of the "Test" food in the experiments was consistent with the previous Examples despite a less concentrated form of alcohol administration. Under these circumstances, it would be expected that the effect of food on alcohol absorption would be lessened by the slower and more prolonged absorption of a more dilute drink and the extended drinking time of the protocol; the results obtained confirm that this was the case.

Example 6

Figure 8:
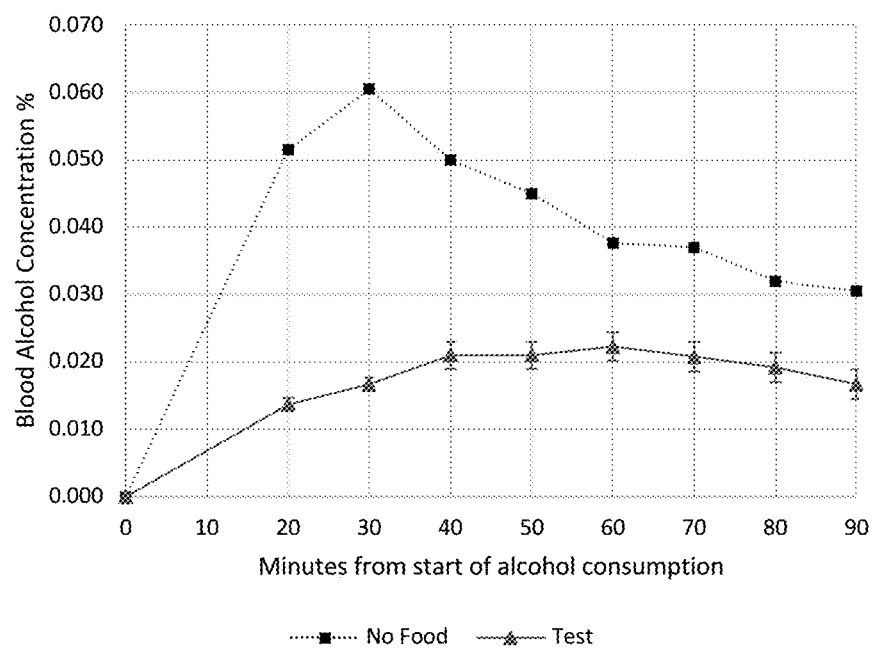
FIG. 8 shows the effects of a solid composition on blood alcohol concentration in a female test subject, as described in Example 6.

Examples 1-5 involved the use of a male test subject; a further set of experiments were carried out using a female subject. The experimental protocol and measurements were identical to those in Example 1 with the following modifications: A female test subject was used (55 years old, 135 lbs, healthy and no history of alcohol abuse), the "No Food" condition was done only one time, the "Test" condition was repeated 3 times using the same food composition of Example 5, and the alcoholic drink was a 20% by volume cocktail that contained 2 oz of 80-proof spirits. The results of the experiments are shown in FIG. 8. The pBAC (0.061%), time course (TTP=30), and AUC60/90 for the "No Food" condition were similar to observations in the previous Examples. The "Test" condition resulted in a profound suppression of alcohol absorption as evidenced by a reduction of pBAC by 63% and the AUC60/90 of 64 and 58% respectively. Furthermore, the TTP was delayed (60 minutes), a similar result to the studies involving the male subject. These results further support the efficacy of the "Test" food composition in reducing and delaying alcohol absorption.

Although the foregoing invention has been described in some detail by way of illustration and examples for purposes of clarity of understanding, it will be apparent to those skilled in the art that certain changes and modifications may be practiced without departing from the spirit and scope of the invention, which is delineated in the appended claims. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

I claim:

1. A method for delaying and/or reducing an increase in blood alcohol concentration, said method comprising ingestion of an edible composition by an individual, prior to or concurrent with consumption of alcohol, wherein the increase in blood alcohol concentration due to consumption of the alcohol is delayed and/or reduced in the individual in comparison to the increase in blood alcohol concentration in the absence of ingestion of the edible composition, wherein said edible composition is a solid manufactured food product comprising: (i) about 10% (w/w) to about 50% (w/w) edible protein, wherein said edible protein comprises whey, casein, milk solids, egg, soybeans, nuts, nut butters, or a combination thereof; and (ii) fiber comprising: about 0.5% (w/w) to about 15% (w/w) hydrocolloid, wherein said hydrocolloid comprises glucomannan, guar gum, xanthan gum, Tara gum, psyllium, carboxymethyl cellulose, or a combination thereof, and/or about 1% (w/w) to about 20% (w/w) insoluble fiber, wherein said insoluble fiber comprises oat hull, wheat bran, corn bran, a natural source of cellulose and/or hemicellulose, or a combination thereof.

2. A method according to claim 1, wherein said ingestion of the edible composition occurs up to about 120 minutes prior to alcohol consumption.

3. A method according to claim 1, wherein said ingestion of the edible composition occurs concurrent with alcohol consumption.

4. A method according to claim 1, wherein said alcohol comprises an alcoholic beverage.

5. A method according to claim 1, wherein the total blood alcohol exposure in the individual is reduced, as measured by the area under the curve for 90 minutes after consumption of said alcohol, in comparison with consumption of said alcohol on an empty stomach.

6. A method according to claim 5, wherein the reduction in total blood alcohol exposure is at least about 20%.

7. A method according to claim 6, wherein the reduction in total blood alcohol exposure is about 20% to about 60%.

8. A method according to claim 1, wherein the peak blood alcohol concentration in the individual is reduced after consumption of said alcohol, in comparison with consumption of said alcohol on an empty stomach.

9. A method according to claim 8, wherein the reduction in peak blood alcohol concentration is at least about 20%.

10. A method according to claim 9, wherein the reduction in peak blood alcohol concentration is about 20% to about 60%.

11. A method according to claim 1, wherein gastric emptying is delayed in the individual, resulting in the delay and/or reduction in the increase in blood alcohol concentration.

12. A method according to claim 11, wherein the gastric emptying half time is increased by at least about 20%.

13. A method according to claim 12, wherein the gastric emptying half time is increased by about 20% to about 100%.

14. A method according to claim 1, wherein (ii) consists of said hydrocolloid.

15. A method according to claim 1, wherein (ii) consists of said insoluble fiber.

16. A method according to claim 1, wherein (ii) comprises both of said hydrocolloid and said insoluble fiber.

17. A method according to claim 1, further comprising carbohydrate and/or fat.

18. A method according to claim 1, wherein said composition is a solid composition formulated as a manufactured food bar.

19. A method according to claim 18, wherein the food bar comprises a maximum weight of about 100 g.

* * * * *